INTEGRATED CIRCUIT BISTABLE MEMORY CELL

Filed May 31, 1967 2 Sheets-Sheet 1

Inventors:
Hubert K. Burke,
Gerald J. Michon,
by Donald R. Campbell
Their Attorney.

Inventors:
Hubert K. Burke,
Gerald J. Michon,
by Donald R. Campbell
Their Attorney.

1

3,389,383

INTEGRATED CIRCUIT BISTABLE MEMORY CELL

Hubert K. Burke, Schenectady, and Gerald J. Michon, Waterford, N.Y., assignors to General Electric Company, a corporation of New York Filed May 31, 1967, Ser. No. 642,465
3 Claims. (Cl. 340—173)

ABSTRACT OF THE DISCLOSURE

A high speed flip-flop bistable memory cell suitable for fabrication as an integrated circuit array is constructed of metal oxide semiconductor field-effect transistors of the same conductivity type. In a "word" organized memory, it comprises a four-transistor flip-flop having a fifth transistor for shunting one load transistor when the word line is energized, and a sixth transistor connected to the juncture of the opposite transistors and to a combination bit-sense line which has signals at two potential levels for writing, one of these or an intermediate potential being applied during non-destructive readout to produce high and low currents indicative of the state of the cell. A continuous read-write cycle is possible, as is a similar "bit" organized memory.

Figure 1:
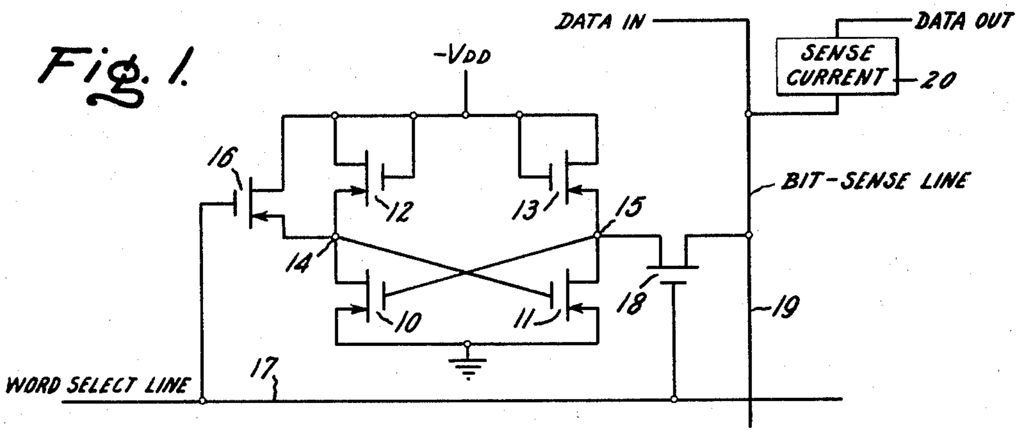

This invention relates to bistable memory elements constructed of insulated gate field-effect transistors, and more particularly to a high speed memory or storage cell employing metal oxide semiconductor field-effect transistors (MOS transistors) which can be fabricated in an array using integrated circuit technology.

It has been suggested that an array type integrated circuit memory element which is potentially economically competitive with other types of storage for digital information, including magnetic core memories is provided by a cross coupled flip-flop having insulated gate type field-effect transistors as the active devices. The flip-flop comprises basically two such insulated gate transistors and load resistors connected in parallel branches between a supply potential and a common potential for the two source electrodes, with the drain electrode of each insulated gate transistor coupled directly to the gate electrode of the opposite insulated gate transistor. One of the active devices is on while the other device is therefore off, and changing the state of one device causes the other device to assume the opposite state due to the regenerative action provided by the cross coupling of the active devices, thereby providing two stable states for storage. Such memory cells are most commonly used in a "word" organized or two-dimensional memory in which one input line to the cell is a word line to select the cell for reading and writing operations while other input and output lines supply bit information to the cell and sense the state of the cell to determine whether a "one" or a "zero" is stored.

The advantages of using MOS transistors for both the active devices and the load resistors of the flip-flop memory cell have been recognized, as has the desirability of certain other features of construction and operation to achieve a high speed element suitable for fabrication in an integrated circuit array, such as low power consumption in the standby or steady state condition, non-destructive readout of the cell and the use of current sensing for the readout rather than voltage sensing, and reducing the number of input-output lines for each cell. In the present invention, further improvements have been achieved by way of optimizing and improving upon these various considerations to achieve a memory element having a simplified addressing scheme and a configuration designed to be compatible to mass production either individually or in an array.

2

Accordingly, an object of the invention is to provide a generally improved and more satisfactory bistable active memory cell made of insulated gate field-effect transistors having a simplified physical configuration and mode of operation.

Another object is the provision of a new and improved high speed flip-flop memory element constructed of a minimum number of metal oxide semiconductor field-effect transistors which has, for a "word" organized memory, only two lines for word selection and data input and output, and requires a relatively small area when fabricated in an array of integrated circuit techniques.

Yet another object is to provide a simplified active flip-flop memory cell constructed entirely of MOS field-effect transistors of the same conductivity type which is especially adapted to a read-write cycle of operations.

In accordance with the invention, a bistable memory cell suitable for fabrication by integrated circuit techniques comprises a cross coupled flip-flop including first and second MOS transistors of the same conductivity type each having a drain electrode cross coupled directly to the gate electrode of the other transistor and having source electrodes connected to a common potential, and the drain electrodes of the first and second transistors are further connected respectively through third and fourth MOS transistors, or through load resistors, to the same supply potential. Thus one of the cross coupled transistors is off and the other is therefore on to provide two stable states for binary storage. An accessing MOS transistor has its load terminals connected to the juncture of the drain of the second transistor and the fourth transistor and to a data input-output line, and its gate is connected to a word select line. The word select line is supplied with word select signals at two potential levels for turning the accessing transistor on and off. The data input-out line is supplied with data input or bit signals at a high and a low potential level for writing a binary "one" and a binary "zero." A readout signal is applied alternatively to the second line during non-destructive readout to produce a high current or a low current output indication which is sensed to determine the state of the cell. The resistances of the transistors when turned on in conjunction with the potential level of the readout signal and the time for applying the readout signal to the cell are chosen such that the cell remains in the same state during readout.

For high speed operation, a shunting MOS transistor has its load terminals connected in parallel with the third MOS transistor and has its gate connected to the input word select line to be turned during writing and reading operations. Desirably, the high potential word select signal, the high potential data input signal and the readout signal are at the same potential, which is higher than the supply potential, and the period of time for which the readout signal is applied is less than the response time of the cell so that the cell does not change state during readout. Furthermore, all of the MOS transistors are preferably of the same conductivity type.

The bistable memory cell can be used in a "word" organized memory as described above, or in a "bit" organized memory, in which case the single accessing MOS transistor is replaced by two accessing MOS transistors connected in series, one having its gate connected to the X select line to be turned on thereby while the other has its gate connected to the Y select line.

Figure 2:
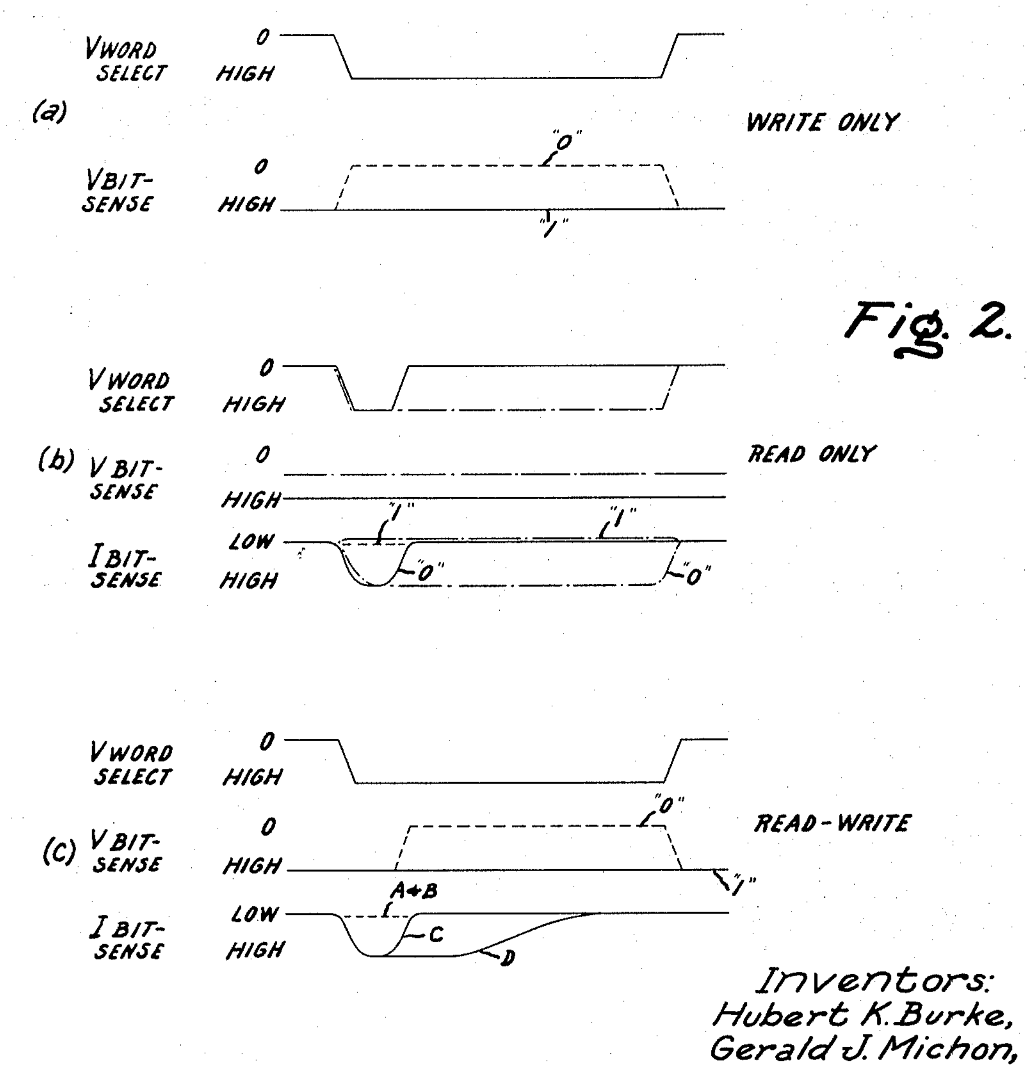
Figure 3:
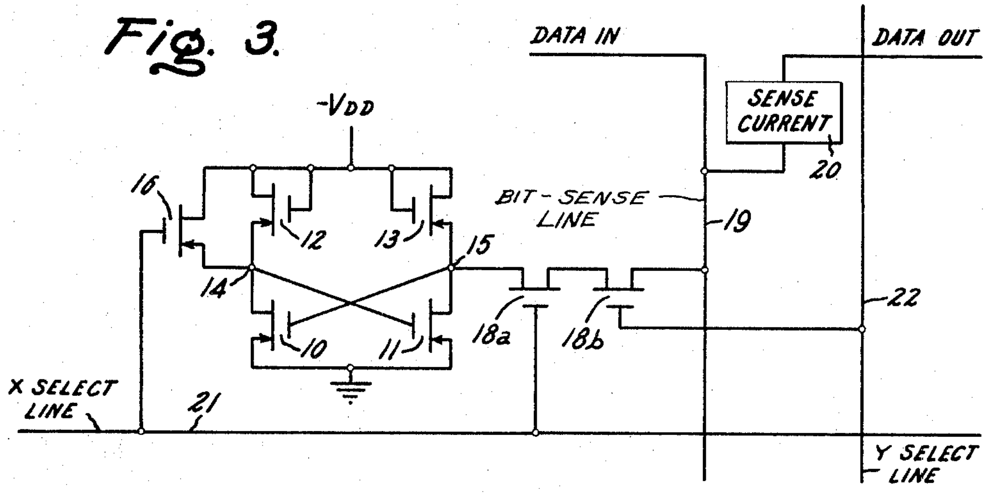
Figure 4:
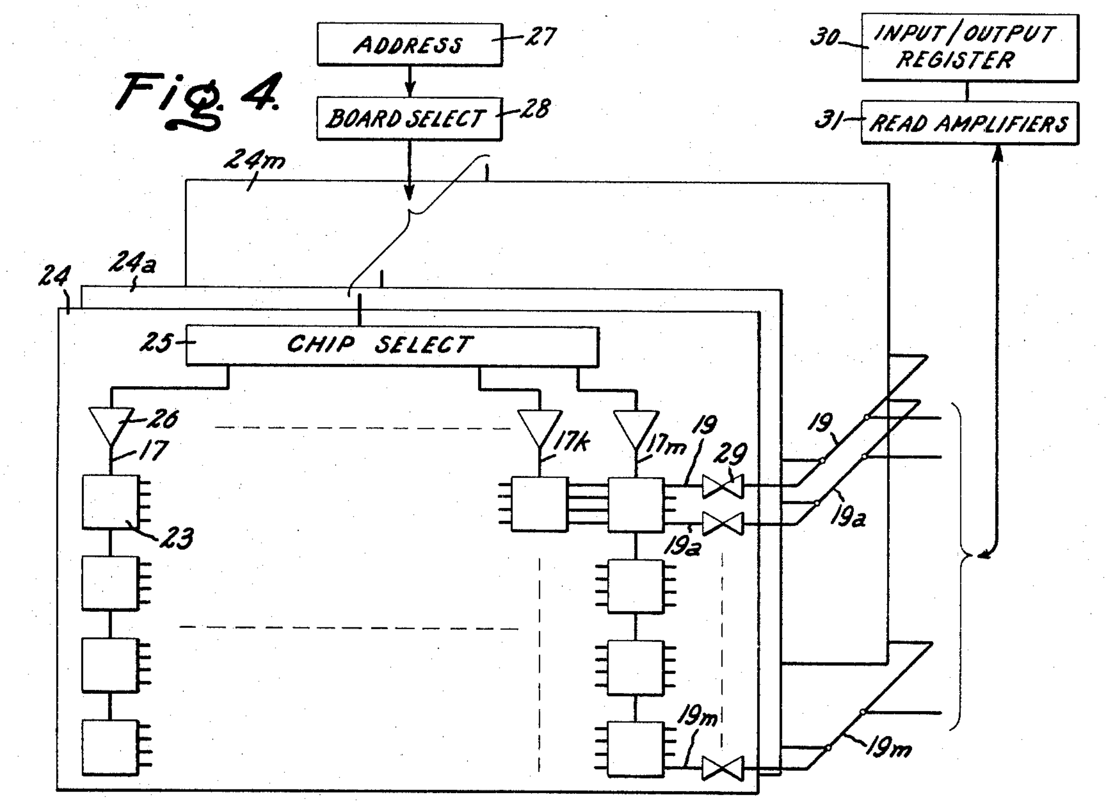

The foregoing and other objects, features, and advantages of the invention will be apparent from the following more particular description of several preferred embodiments of the invention, as illustrated in the accompanying drawings wherein:

FIG. 1 is a schematic circuit diagram of a bistable memory cell constructed in accordance with the invention for utilization in a "word" organized memory;

FIGS. 2*a*, 2*b*, and 2*c* are waveform diagrams illustrating the conditions of the inputs and outputs of the memory cell of FIG. 1 for, respectively, a write only operation, a read only operation, and a read-write cycle of operation;

FIG. 3 is a schematic circuit diagram similar to FIG. 1 of a bistable memory cell for a "bit" organized memory; and FIG. 4 is a diagrammatic perspective view of an illustratory packaging arrangement for a "word" organized memory array.

Referring to FIG. 1, the bistable memory cell or storage element comprises a flip-flop having a first transistor 10 and a second transistor 11 as the two active devices. The transistors 10 and 11 are insulated gate type field-effect transistors, and are preferably metal oxide semiconductor field-effect transistors, which will hereafter be referred to as MOS transistors or MOS-FET devices. It has been noted that the use of MOS-FET devices in the design of a memory element has several advantages including the ability to fabricate resistors in MOS technology, the possibility of making these devices with different resistances when turned on or conducting by control of the physical dimensions of the devices, and the bidirectional conducting characteristics of these devices. The source electrode of each of the MOS transistors 10 and 11 is connected to a common potential, such as ground, and the drain electrode of the transistor 10 is connected in series with the source-to-drain conduction path of a third MOS-FET device 12 while the drain electrode of the other MOS transistor 11 is connected in series with the source-to-drain conduction path of a fourth MOS-FET device 13. The four MOS transistors 10, 11, 12, and 13 are of the same conductivity type and are here illustrated as being P-channel devices so that the drain electrodes of the transistors 12 and 13 are connected to the same source of negative supply potential $-V_{DD}$. A memory cell using all N-channel devices is also possible provided the polarities are reversed, and the use of N-channel and P-channel devices connected in complementary fashion is possible in a bistable flip-flop although not the same type as has been illustrated. The MOS transistors 12 and 13 function as first and second load resistors, respectively, and to this end the gate electrode of each device is connected to its drain electrode. In this configuration the MOS transistors behave like resistors whose resistance is linear as long as the applied drain-to-source voltage is large compared to their voltage thresholds. To complete the basic flip-flop, the gate electrode of each of the active devices 10 and 11 is connected directly to the drain electrode of the opposite device, thereby defining a first circuit point or node 14 at the juncture between the drain electrode of the transistor 10 and the load transistor 12, and a second circuit point or node 15 at the juncture between the drain electrode of the transistor 11 and the load transistor 13.

In the standby or steady state condition of the flip-flop, one of the transistors 10 or 11 is on while the other is off to thereby provide a bistable storage mechanism for a binary "one" or a binary "zero." There are two stable states, since turning on or off one of the transistors 10 or 11 causes the other transistor to assume the opposite state of conductivity due to the regenerative action provided by the cross coupling of the two devices. For example, if a binary "zero" is defined when the first transistor 10 is off and the second transistor 11 is turned on, the voltage at the node point 15, which is the same as the potential of the drain electrode of the second transistor 11 and the voltage at the gate electrode of the first transistor 10, is at approximately a fraction of a volt below ground which is less than the threshold voltage of the transistor 10, so that transistor 10 is off. Applying a potential to the node point 15 which is more negative than the threshold voltage of the transistor 10 causes the first transistor 10 to turn on thereby driving the potential at the node point 14 toward ground and turning off the second transistor 11. By the convention defined above, upon removal of the applied potential the transistors 10 and 11 are now in a binary "one" condition.

In the standby condition of the memory cell when the flip-flop is in either one of its two stable states, and assuming that the other transistors shown in FIG. 1 are all off, the standby power consumption or holding power of the memory cell can be minimized by choosing load transistors 12 and 13 to have high resistance values in their respective source-to-drain conduction paths. For a MOS-FET device this can be achieved by making the length-to-width ratio large; however a compromise must be reached in order not to take up too great an area when the memory cell is fabricated by integrated circuit techniques. Both of the load transistors 12 and 13 are connected to be on continuously, but current is drawn only through the load transistor connected to the conducting active transistor drain electrode, and by designing them to have a relatively large resistance when turned on, as here defined, the current in the conducting parallel branch of the flip-flop is comparatively small when a low supply voltage is used. Although one of the design considerations for the present memory cell is to minimize the standby holding power, this requirement must be consistent with the requirement to obtain a high speed cell in which a read-write cycle of operation is completed in the range of about 100–250 nanoseconds. As is known, the speed at which a flip-flop can be switched from one steady state condition to the other is directly proportional to the values of the load resistances. To improve the switching speed, one of the load transistors 12 or 13 (but not both) is shunted by low resistance path only when reading and writing operations are taking place. Thus, the load terminals of the MOS transistor 12, i.e., its source and drain electrodes, are shunted by a fifth MOS-FET device 16 of the same conductivity type as the MOS-FET devices comprising the flip-flop. Corresponding load terminals of the shunting transistor 16 and the first load transistor 12 are connected together so that the source-to-drain conduction paths of the two devices are effectively connected in parallel circuit relationship. The gate electrode of the shunting transistor 16 is connected to the word select line 17 to be energized to turn on the transistor 16 whenever the particular memory cell is selected for reading and writing operations. With the shunting transistor 16 turned on, the quiescent current is increased and the combined load impedance of the parallel combination of the two devices 12 and 16 presents a lower impedance to drive the circuit capacitance. This load impedance is non-linear because of the characteristics of the MOS-FET devices. The speed of response is determined by the RC circuit constants and is improved by lowering the resistance factor. The circuit capacitances appear primarily in the gate electrodes of the active devices 10 and 11 of the flip-flop and in the input and output lines, which when fabricated in integrated circuit technology can have appreciable capacitance. The shunting transistor 16, however, still serves as a load resistor for the active device 10 and has an "on" resistance value when conducting which is several times higher than the "on" resistance of the transistor 10. The use of the shunting transistor 16 is not essential in a memory cell having the addressing scheme to be described, but is desirable since the cell then has a higher switching speed.

The memory cell having the addressing scheme shown in FIG. 1 is suitable for a "word" organized memory. In this type of memory organization, which is also called a two-dimensional or "linear select" memory, there is a cell for each bit in the word and all of the cells for a selected word are energized at the same time by signals applied over a word select line. Data is entered into a particular one of the cells in a word by means of signals applied over a bit line which is usually connected to corresponding bits in other words of the memory. In FIG. 1 in addition to being connected to the gate of the shunting transistor 16, the word select line 17 is also coupled to the gate electrode of a sixth MOS-FET device 18 which is turned on to obtain access to the flip-flop for reading and writing operations. One load electrode of the MOS transistor 18 is connected to the second node point 15 between the second transistor 11 and the second load resistor device 13, and the other electrode is connected to a combination bit-sense line 19 which as will be explained later in greater detail is used to write information into the memory cell and also during readout to sense the state of the cell. The source and drain of the accessing transistor 18 are not identified since the bidirectional conducting characteristics of the MOS-FET device are utilized. The MOS transistor 18 is of the same conductivity type as the other five MOS-FET devices which make up the memory cell and is thus a P-channel type device also.

So long as the accessing MOS transistor 18 is in its non-conducting state, or cut off, the memory cell is stable and the flip-flop is in either one of its two stable states storing a binary "one" or a binary "zero." When the transistor 18 is switched to its conducting state, binary information can be entered into the cell. The input signals on the word select line 17 consequently have two potential levels, a low potential level at or near ground for maintaining the accessing transistor 18 in a cut-off condition, and a high level potential for turning on the transistor 18. The high potential word select signal is also applied to the gate of the shunting transistor 16 to turn it on, and it is preferable that the high potential word select signal have a higher potential, in this case a more negative potential since P-channel devices are being used, than the supply potential $-V_{DD}$ in order that the shunting transistor 16 remain on in a low impedance condition during a complete writing or read-write cycle of operation. For convenience the potential levels of the signals appearing on the word select line 17 are desirably the same as those that appear on the bit-sense line 18, as will be explained in detail later.

To write binary information into the memory cell, the word select line 17 is energized to turn on the accessing transistor 18 and the data input signals are applied to the bit-sense line 19 which now functions as an input line. The data input or bit signals are at a high potential level and a low potential level according to whether a binary "one" or a binary "zero" is to be written into the cell. For purposes of discussion, the bit signal for writing a binary "zero" will be assumed to be at the low potential at or near ground. Referring also to FIG. 2*a*, if the bit line 19 is low at or near ground level when the word select line 17 is high to turn on the accessing transistor 18, the node point 15 of the flip-flop is at or near ground level, as is the gate of the transistor 10 which either turns off or remains off, according to its previous state. By way of the regenerative action of the flip-flop, the other transistor 11 is switched on or remains on according to its previous state. Upon the de-energization of the word select line 17, the memory element will remain in this state which can be defined as one of the two binary states. According to the previous convention, the transistor 10 turned off is a binary "zero." To write a binary "one" the bit line 19 is at its high potential level when the word select line 17 is energized. At this moment the transistor 11 is turned on, as are the load transistor 13 and accessing transistor 18, and the "on" resistance of the load transistor 13 is high as compared to the "on" resistances of the transistors 11 and 18. Then the voltage divider action between the "on" resistances of the two transistors 11 and 18 raises the potential at the node point 15 to a higher potential than the threshold voltage of the gate electrode of the transistor 10 causing the transistor 10 to conduct. Regenerative action will turn transistor 11 off resulting in the second stable state of the flip-flop, the "one" state by the previous definition.

The state of this cell can be determined without changing the stored data; that is, the memory elements can be read out non-destructively. Two methods of non-destructive readout will be discussed. In both methods the potential of the bit-sense line is set at a single "high" level (see FIG. 2*b*) and the word select line 17 is energized to turn on the accessing transistor 18. The difference in the two methods depends on the potential level that is used in conjunction with the time the signal is applied to the cell as determined by the time the accessing transistor is turned on. It might be mentioned at this point that a higher memory operating speed can be achieved when information is retrieved non-destructively from the memory. Furthermore, higher speed operation is obtained when current sensing is employed for the readout, since it is then unnecessary to charge and discharge line capacitances as would be the case if voltage sensing were used.

In the first readout method, let it be assumed that the cell contains a binary "one" and that the transistor 10 is conducting while the transistor 11 is switched off, and that the word select line 17 is energized and a readout signal appears on bit-sense line 19 (see dash-dot line showing, FIG. 2*b*). The potential at node point 15 is driven to a voltage determined by the resistive voltage divider composed of the "on" resistances of the MOS transistors 13 and 18 in conjunction with the power supply potential $-V_{DD}$ and the readout potential on line 19. Since the "on" resistance of load transistor 13 is large compared to the "on" resistance of accessing transistor 18, the voltage at the node point 15 is approximately equal to the potential on the bit-sense line during readout and is greater than the threshold voltage of transistor 10. Therefore, the transistor 10 remains on and the transistor 11 consequently remains off, and the current in the bit-sense line 19 is relatively small as determined by the values of the "on" resistance of load transistor 13 and $-V_{DD}$. The current level is sensed in a suitable sense circuit 20, and if required appropriate gating is provided. In reading a binary "one" by the first method, the extent to which the resulting voltage at node point 15 exceeds the threshold voltage makes no difference as this merely turns on transistor 10 harder.

If on the other hand the cell contains a binary "zero" during non-destructive readout by the first method, the transistor 10 is off and the transistor 11 is turned on. At readout, the potential at node point 15 is determined primarily by the potential on line 19 and the respective "on" resistances of transistors 11 and 18 acting as a voltage divider. By properly choosing the ratio of the "on" resistances of transistors 11 and 18 (both being low compared to the high "on" resistance of load transistor 13), the voltage at node point 15 is less than the potential on bit-sense line 19 and can be limited to a value less than the threshold voltage of transistor 10. Thus, the transistor 10 remains off and the memory element retains the binary "zero." There is a relatively high current in the bit-sense line during readout which is indicative of a binary "zero." In this first method of readout, an intermediate potential readout signal is used and the amount of time for which the readout signal is applied to the cell is not critical since in one case (reading a "one") the potential at node point 15 turns the on transistor 10 on harder and in the other case (reading a "zero") the potential at node point 15 is less than the threshold of the now off transistor 10. Hence, the state of the cell does not change. In FIG. 2*b*, referring to the dash-dot line showing, the reading time is illustrated as being as long as the writing time. For this method of readout it is observed that the readout potential on the bit-sense line must be less than the value of the high potential on line 19 when writing into the cell, which is high enough to change the state of the cell when applied for a time greater than the response time of the cell, the response time being dependent on the internal capacitance-resistance time constants.

In the second method of readout, which is preferred because it is faster and simplifies the addressing, the potential on the bit-sense line 19 during non-destructive readout is set at a high enough level to write into the cell, but it is applied to the cell for a time less than the response time of the cell so that the cell does not change state during readout. This can be seen in FIG. 2*b* (solid line showing) where the word select line is energized to turn on accessing transistor 18 for a much shorter time during readout than during writing. To go through the analysis for reading a binary "one," there is no difference as compared to the first method, since the potential at node point 15 is essentially the same as the potential on bit-sense line 19 during readout (transistor 11 is off and the "on" resistance of accessing transistor 18 is low compared to the "on" resistance of load transistor 13) which is higher than the threshold voltage of transistor 10 so that transistor 10 remains on and there is no change of state. There is a relatively low current in the bit-sense line (dotted line showing) signifying a binary "one." When reading a binary "zero," the readout potential on line 19 is high enough to drive the potential at node point 15 to a potential greater than the threshold voltage of the transistor 10 (transistor 11 is on and the voltage divider action of the "on" resistances of transistors 11 and 18 determines the potential at node point 15). Thus transistor 10 would tend to turn on and change the cell, except that the readout potential is applied for a time less than the response time of the cell so that it does not change state. A high current pulse is produced in the bit-sense line 19 (solid line showing) indicating a binary "zero."

It is seen that the readout signal when using the second non-destructive readout method may be at the same potential level as is used for writing into the cell. Greater simplicity and convenience of addressing is achieved when the high potential signal applied to the word select line 17, the high potential level bit signal for writing applied to line 19, and the potential level for the readout signal during non-destructive reading applied alternatively to line 19 are all the same, preferably higher or more negative in this case than $-V_{DD}$. The low potential signals on lines 17 and 19, as has been mentioned, are preferably at ground potential. In a typical example, $V_{DD}=-10$ v., the signals on word select line 17 and bit-sense line 19 are 0 v. and $-15$ v., and the threshold voltage on the gates of transistors 10 and 11 are about $-2.5$ v. In addition to the simplicity, as has been mentioned readout is faster when the readout signal on line 19 is at the same potential as the high potential bit signal for writing.

The foregoing description was for write only and read only operations. This memory cell is especially suitable for a continuous read-write cycle of operation and will be described only for the preferred conditions just given using the second readout method. Four conditions are possible as set forth in the following table:

TABLE

| | Read | Write |
|---|---|---|
| A | 1 | 0 |
| B | 1 | 1 |
| C | 0 | 0 |
| D | 0 | 1 |

For all of these possibilities the word select line 17 is at its high potential as is initially the bit-sense line 19. If it is desired to write a binary "zero," the bit-sense line 19 is not dropped to its low potential at ground until after the period of time needed for readout. The current sensed on the line 19 during readout is low when reading a "one" (conditions A and B) and is high for reading a "zero" (conditions C and D). For condition A, the potential on the bit-sense line is initially high to read out a "one" and is then raised to ground level to sequentially write a "zero." For condition B, the potential on the bit-sense line is initially high and remains at this high potential level in order to write in a "one." During readout for condition C there is a high current pulse indicating a stored "zero," and slightly before the termination of the pulse the bit-sense line is raised to ground level in order to write a "zero" and prevent the transistor 11 from being switched off. In condition D, the high current level produced when reading out a "zero" occurs, but in this case the bit-sense line remains at its high potential level for a time longer than the response time of the cell and causes the cell to switch states before the termination of the writing operation as indicated by the fact that at the end of the writing operation the current in the bit-sense line is low.

The memory cell of FIG. 1 is designed for a "word" organized memory and can achieve high speed operation in the range of about 30–100 nanoseconds for a read only operation and about 100–250 nanoseconds for a read-write cycle of operation. As has been pointed out, it is particularly suitable to be fabricated as a monolithic integrated circuit, either individually or in array. A complete high speed memory cell requires only six MOS transistors and only two addressing lines, namely, the word select line 17 and the combination bit-sense line 19 which can be used for writing and reading both "ones" and "zeros." Because of the small number of components and the simplified addressing scheme, the cell requires only a small area on a monolithic chip. Moreover, as has been mentioned, the use of MOS-FET devices allows the resistances of the various devices when turned on to be varied by changing the layout geometry of the individual devices. The components exterior to the cell itself needed to operate the cell are simplified and reduced also. Because there are only two input-output lines, only two drive amplifiers are needed, and it is necessary to have only two sources of potential, namely, the supply potential and one other source for energizing the word select line 17 and the combination bit-sense line 19 In summary, economies are achieved by means of the simplification of the physical configuration and mode of operation of the memory cell, making it more attractive for larger array memories.

The binary memory cell shown in FIG. 3 is for a "bit" organized memory. A "bit" organized memory has a three-dimensional organization in which an X select line and a Y select line must be energized in order to select a memory cell for writing and reading operations. The number of words is equal to the number of memory cells arranged in a matrix in a plane, and the planes are stacked one upon the other with the number of planes being equal to the number of bits in a word.

The flip-flop portion of the memory cell in FIG. 3 is identical to the flip-flop shown in FIG. 1. The gate of shunting transistor 16, instead of being energized by a word select line, is now energized by an X select line 21. The single accessing transistor 18 through which data is entered into the memory cell and retrieved from the memory cell is replaced by a pair of MOS transistors 18*a* and 18*b* having their load electrodes connected in series circuit relationship. The gate electrode of the one accessing transistor 18*a* is energized by X select signals from the input line 21. The gate of the other accessing transistor 18*b* is energized by Y select signals appearing on a Y select line 22. Thus, data can be entered into the memory cell over the combination bit-sense line 19 and the state of the cell can be sensed only when both the X select line 21 and the Y select line 22 are energized.

The read and write operations for the "bit" organized memory cell are the same as described with the "word" organized memory cell except that the two accessing MOS transistors 18*a* and 18*b* take the place of the single accessing transistor 18 of FIG. 1 but function in combination in essentially the same manner. Although many of the advantages of the "word" organized memory cell are retained in the "bit" organized memory cell of FIG. 3, it will be noted that this memory element requires an additional MOS transistor and at least three input-output lines 19, 21, and 22.

FIG. 4 illustrates one manner of packaging the memory cell for a "word" organized memory wherein the cells are fabricated in arrays on monolithic integrated circuit chips. The chips 23 are arranged in rows and columns on an individual board 24, and there may be additional boards 24*a* . . . 24*m* in a stack according to the size of the complete memory array. Each chip 23 contains a square array of $n$ words of $n$ bits each, or $n^2$ bits, although a square array is not required and word length can be adjusted to fit individual requirements. The word selection lines 17 . . . 17*k*, 17*m* extend vertically through a column of the chips 23 and are selected on each board from a chip select circuit 25 operating through word decode and driver circuits 26. Word selection decoding can be done on a chip, reducing the number of word select lines logarithmically. In addition, an address register 27 and board select circuit 28 choose a particular one of the boards 24, 24*a* . . . 24*m* on which the desired word appears. The bit-sense lines 19, 19*a* . . . 19*m* extend horizontally through the chips 23 and are each driven by a bidirectional amplifier 29. The bit lines in corresponding rows of the several boards 24, 24*a* . . . 24*m* are connected in parallel and are thus energized simultaneously, although only the one cell on one of the boards whose word select line is energized at this time is selected for reading and/or writing operations. An input/output register 30 is provided for the bit addresses, and also for output indications of the state of the selected cells as obtained from a read amplifier 31. During writing the read amplifiers 31 are bypassed.

The bistable memory cell which has been described can, in summary, be switched at high speeds while retaining the advantage of low standby power. Reading and writing into the memory element can be accomplished using a single bit-sense line which can be operated at low impedance, hence, at high speed. Further, the memory element can be read out non-destructively and produces current output signals indicative of its state. In a "word" organized memory, two lines supply all the information needed to select a cell, write data in and sense its state, and obtain an indication thereof. A memory using these elements can be either "bit" or "word" organized, and can be constructed in an integrated circuit array form with many memory elements in one monolithic structure. Because of the small number of MOS-FET devices which are required, which can be small area devices since the current levels are low, and because of the simplified addressing scheme, the memory cell requires only a small area on an integrated circuit chip and can be produced economically.

While the invention has been particularly shown and described with reference to the preferred embodiments thereof, it would be understood by those skilled in the art that various changes in form and details may be made therein without departing from the spirit and scope of the invention.

What we claim as new and desire to secure by Letters Patent of the United States is:

1. A bistable cell suitable for fabrication by integrated circuit technology comprising a bistable flip-flop including first and second metal oxide semiconductor field-effect transistors of the same conductivity type each having a drain electrode cross coupled directly to the gate electrode of the other transistor and having source electrodes connected to a common potential, the drain electrodes of the first and second transistors being further connected respectively through third and fourth metal oxide semiconductor field-effect transistors to the same supply potential, whereby one of the aforementioned cross coupled transistors is turned on and the other is therefore turned off to provide two stable states for storage, respectively, of a binary "one" and a binary "zero," characterized by an accessing metal oxide semiconductor field-effect transistor having one load electrode connected to the juncture between the fourth transistor and the drain of the second transistor, a first input word select line connected to the gate of the accessing transistor which is supplied with word select signals at two potential levels for turning on the accessing transistor when the signal is at one level and turning off the accessing transistor when the signal is at the other level to thereby select the memory cell for reading and writing operations, and a second data input-output line connected to the other load electrode of the accessing transistor which is supplied with data input signals at high and low potential levels for writing a "one" when the data input signal is at one level and for writing a "zero" when the data input signal is at the second level, a readout signal at a single potential level also being applied alternatively to the second data input-output line during non-destructive readout to produce a low current or a high current in the second line according to whether a "one" or a "zero" is stored in said flip-flop, to thereby provide an output indication of the state of the cell, the resistances of the transistors when turned on in conjunction with the potential level of the readout signal and the time for applying the readout signal to the cell being such that the cell remains in the same state during non-destructive readout, wherein the readout signal is at the same potential level as the high potential data input signal and produces at the junction of the fourth transistor and the drain of the second transistor a potential which is greater than the threshold voltage at the gate of said first transistor, the readout signal being applied to the cell for a period of time less than that required to change the state of the cell, and wherein said third and fourth transistors function as relatively high resistance value load resistors and each has its respective gate connected to its drain which in turn is connected to the source of supply potential, and further including a shunting metal oxide semiconductor field-effect transistor having its load terminals connected across the load terminals of said third transistor and its gate connected to the first input word select line to be turned on to shunt the third transistor when the one word select signal is applied to turn on the accessing transistor and select the memory cell for reading and writing operations, and wherein all of said transistors are of the same conductivity type.

2. A bistable memory cell constructed of metal oxide semiconductor field-effect transistors and suitable for fabrication by integrated circuit technology comprising a bistable flip-flop including first and second metal oxide semiconductor field-effect transistors each having a drain electrode connected respectively to first and second relatively high resistance value load resistors and a gate electrode which is connected directly to the drain of the other transistor, the two load resistors being connected to the same supply potential while the source electrodes of the first and second transistors are connected to a common potential, whereby one of the cross coupled transistors is turned on and the other is therefore turned off to provide two stable states for storage, respectively, of a binary "one" and a binary "zero," characterized by an accessing metal oxide semiconductor field-effect transistor having one load electrode connected to the juncture between the drain of the second transistor and the second load resistor, a first word select line connected to the gate of the accessing transistor which is supplied with word select signals at two potential levels for turning on the accessing transistor when the signal is at one level and turning off the accessing transistor when the signal is at the other level to thereby select the memory cell for reading and writing operations, a shunting metal oxide semiconductor field-effect transistor having its load terminals connected across said first load resistor and its gate connected to the first word select line to be turned on to shunt the first load resistor when the accessing transistor is turned on and thereby increase the speed of operation of the cell, a second data input-output line connected to the other load electrode of the accessing transistor which is supplied with data input signals at high and low potential levels for writing a "one" when the data input signal is at one level and for writing a "zero" when the data input signal is at the second level, the data input signal at the high potential level being alternatively applied to the second data input-output line as a readout signal during non-destructive readout to produce a high current or a low current in the second line according to whether a "one" or a "zero" is stored in said flip-flop, to thereby provide an output indication of the state of the cell, the resistances of the second transistor and accessing transistor when turned on being such that the potential at the juncture between the drain of the second transistor and second load resistor is greater than the threshold voltage at the gate of said first transistor, said readout signal being applied for a period of time less than that required to change the state of the cell, and wherein all of said aforementioned transistors are of the same conductivity type, wherein said first and second load resistors are provided by additional metal oxide semiconductor field-effect transistors of the same conductivity type as said aforementioned transistors, each having its respective gate connected to its drain which is in turn connected to the supply potential, and the high potential word select signal and the high potential data input signal which is also used as a readout signal are at the same potential level, and wherein the aforementioned single accessing transistor is replaced by two accessing metal oxide semiconductor field-effect transistors connected in series circuit relationship, and the input word select line is replaced by an X select input line and a Y select input line one of which is connected to the gate of one of the series connected accessing transistors while the other is connected to the gate of the other accessing transistor, one of said X and Y select lines also being connected to the gate of said shunting transistor.

3. A bistable memory cell suitable for fabrication by integrated circuit technology comprising a bistable flip-flop including first and second metal oxide semiconductor field-effect transistors each having a drain electrode cross coupled directly to the gate electrode of the other transistor and having source electrodes connected to a common potential, the drain electrodes of the first and second transistors being further connected respectively through the source-to-drain conducting paths of third and fourth metal oxide semiconductor field-effect transistors which function as relatively high resistance value load resistive elements and each has its respective gate connected to its drain which in turn is connected to a source of supply potential, whereby one of the aforementioned cross coupled transistors is conducting and the other is therefore nonconducting to provide two stable states for storage, respectively, of a binary "one" and a binary "zero," characterized by an accessing metal oxide semiconductor field-effect transistor having one load electrode connected directly to the junction between the fourth transistor and the drain of the second transistor, a shunting metal oxide semiconductor field-effect transistor having its source-to-drain conducting path connected in parallel circuit relationship across the source-to-drain conducting path of said third transistor, means for addressing the bistable flip-flop comprising only two signal lines wherein the first of said signal lines is a word select line connected to the gate electrodes of both the accessing transistor and the shunting transistor for conducting signals for selectively turning on said transistors to respectively select the cell for reading and writing operations and to shunt the second transistor when the cell is selected, and the second of said signal lines is connected to the other load electrode of said accessing transistor for conducting data input signals to drive the flip-flop to a selected one of its two stable states and for alternatively conducting non-destructive readout signals for producing output currents indicative of the state of the cell, and means for sensing the current in the second signal line when the readout signal is applied, the resistances of said second transistor and accessing transistor when rendered conductive in conjunction with the high resistance of the fourth transistor being such that the potential at the junction of the second and fourth transistors has a preselected value relative to the threshold voltage at the gate electrode of the first transistor.

References Cited

UNITED STATES PATENTS

| | | | |
|---|---|---|---|
| 3,218,613 | 11/1965 | Gribble | 340—173 |
| 3,284,782 | 11/1966 | Burns | 340—173 |

TERRELL W. FEARS, *Primary Examiner.*